United States Patent [19]

Husman et al.

[11] Patent Number: 4,554,324

[45] Date of Patent: Nov. 19, 1985

[54] ACRYLATE COPOLYMER PRESSURE-SENSITIVE ADHESIVE COMPOSITION AND SHEET MATERIALS COATED THEREWITH

[75] Inventors: James R. Husman, South St. Paul; James N. Kellen, Oakdale; Rebecca E. McCluney, Maplewood; Michael L. Tumey, St. Paul, all of Minn.

[73] Assignee: Minnesota Mining and Manufacturing Co., Saint Paul, Minn.

[21] Appl. No.: 719,974

[22] Filed: Apr. 4, 1985

Related U.S. Application Data

[62] Division of Ser. No. 419,025, Sep. 16, 1982.

[51] Int. Cl.$^4$ .......................................... C08F 259/04
[52] U.S. Cl. ..................................... 525/301; 525/309
[58] Field of Search ............... 525/301, 309; 526/328, 526/328.5, 329, 329.3, 317, 329.7

[56] References Cited

U.S. PATENT DOCUMENTS

| | | | |
|---|---|---|---|
| Re. 24,906 | 12/1960 | Ulrich | 206/59 |
| 2,544,692 | 3/1951 | Kugler et al. | 117/122 |
| 2,553,816 | 5/1951 | Ebel | 117/122 |
| 2,889,038 | 6/1959 | Kalleberg | 206/59 |
| 2,925,174 | 2/1960 | Stow | 206/59 |
| 2,956,904 | 10/1960 | Hendricks | 117/93 |
| 2,973,286 | 2/1961 | Ulrich | 117/122 |
| 3,004,958 | 10/1961 | Berens | 260/86.3 |
| 3,008,850 | 11/1961 | Ulrich | 117/122 |
| 3,062,683 | 11/1962 | Kalleberg et al. | 117/122 |
| 3,135,717 | 6/1964 | Gregorian et al. | 260/45.5 |
| 3,235,626 | 2/1966 | Waack | 260/881 |
| 3,239,478 | 3/1966 | Harlan, Jr. | 260/27 |
| 3,307,690 | 3/1967 | Bond et al. | 206/59 |
| 3,390,206 | 6/1965 | Thompson et al. | 260/375 |
| 3,514,500 | 5/1970 | Osmond et al. | 260/874 |
| 3,625,752 | 12/1971 | Korpman et al. | 117/122 P |
| 3,627,837 | 12/1971 | Webb | 260/836 |
| 3,716,506 | 2/1973 | Simms et al. | 260/22 |
| 3,725,115 | 4/1973 | Christenson et al. | 117/93.31 |
| 3,729,338 | 4/1973 | Lehmann et al. | 117/122 P |
| 3,769,254 | 10/1973 | Anderson et al. | 260/33.4 PO |
| 3,786,116 | 1/1974 | Milkovich et al. | 260/885 |
| 3,787,531 | 1/1974 | Dahlquist et al. | 260/876 B |
| 3,832,423 | 8/1974 | Milkovich et al. | 260/878 R |
| 3,861,948 | 1/1975 | Samour et al. | 117/122 |
| 3,862,267 | 1/1975 | Milkovich et al. | 260/878 R |
| 3,880,953 | 4/1975 | Downey | 260/876 B |
| 3,954,692 | 5/1976 | Downey | 260/33.6 |
| 4,007,311 | 2/1977 | Harlan, Jr. | 260/859 R |
| 4,074,004 | 2/1978 | Bateson et al. | 428/355 |
| 4,075,186 | 2/1978 | Ambrose | 260/887 |
| 4,136,071 | 1/1979 | Korpman | 260/27 |
| 4,148,771 | 4/1979 | Nash | 260/27 BB |
| 4,157,418 | 6/1979 | Heilmann | 428/355 |
| 4,163,077 | 7/1979 | Antonsen et al. | 428/355 |
| 4,181,752 | 1/1980 | Martens et al. | 427/54.1 |
| 4,199,646 | 4/1980 | Hori et al. | 428/355 |
| 4,288,480 | 9/1981 | Grzywinski et al. | 428/40 |
| 4,303,485 | 12/1981 | Levens | 205/159.24 |

FOREIGN PATENT DOCUMENTS 872532 7/1961 United Kingdom .

Primary Examiner—Edith Buffalow
Attorney, Agent, or Firm—Donald M. Sell; James A. Smith; Richard Francis

[57] ABSTRACT

The invention provides normally tacky and pressure-sensitive adhesive compositions comprising a polymer having an inherent viscosity greater than 0.2 and having in its backbone at least a major portion by weight of polymerized monomeric acrylic or methacrylic acid ester of a non-tertiary alcohol and, having attached to the backbone, polymeric moieties having a weight average molecular weight of above about 2,000 and a $T_g$ of above about 20° C. The number and composition of the attached moieties in the polymer is such as to provide the adhesive composition with a shear holding value of at least 50 minutes. Sheet materials coated with the adhesive composition are also provided. Preferred adhesive composition comprises a copolymer monomeric acrylic or methacrylic acid ester of non-tertiary alcohol and macromolecular monomer. The copolymer may also include up to 12% by weight of a copolymerizable polar monomer such as acrylic acid.

8 Claims, No Drawings

ACRYLATE COPOLYMER PRESSURE-SENSITIVE ADHESIVE COMPOSITION AND SHEET MATERIALS COATED THEREWITH

This is a division of application Ser. No. 419,025 filed Sept. 16, 1982.

TECHNICAL FIELD

This application relates to normally tacky pressure-sensitive adhesive compositions comprising a polymerized acrylic or methacrylic acid ester backbone having grafted pendant polymeric moieties and sheet materials coated therewith.

BACKGROUND ART

Normally tacky pressure-sensitive adhesive (hereinafter identified by the abbreviation "psa") compositions suitable, for example, for use in adhesive tapes must have a requisite fourfold balance of adhesion, cohesion, stretchiness and elasticity. Psa coated tapes have been produced for at least a half a century. The expectation level of the performance of early psa coated tapes was, to say the least, not great. Early psa tapes were expected to at least temporarily adhere to the surface upon which they were adhered and certain minor problems such as adhesive failure, discoloration, cohesive failure, etc. were tolerated. As psas became more sophisticated, mainly because of research in this area, the expectation level of the performance of the psa on coated tapes reached an extremely high level.

Some psa compositions desirably have transparency and resistance to sunlight aging even on exposure to severe weather conditions. With environmental considerations being more important, solvent-free processability is also a desired but often elusive feature.

Early psa compositions consisted of natural crude rubber tackified by admixture with esterified wood rosin. This was later improved by the introduction of synthetic acrylic ester elastomers which were inherently tacky and possessed the elasticity and compliance required for the fourfold balance of properties of a true psa. As the need arose, improvements were made in the basic acrylic ester psa to meet the needs in the marketplace. Transparency and resistance to oxidation inherent in acrylic ester psas made them outstanding candidates for the most demanding psa tape applications.

Many block copolymers have psa properties and have cohesive strength and hot melt processability, but they do not have the oxidative resistance or the optical clarity of the acrylic ester adhesives. Various references teach block copolymer psa compositions, but not how to improve the latter properties. Instead, Harlan (U.S. Pat. No. 3,239,478) teaches how "oil-tolerant" they can be, Korpman (U.S. Pat. No. 3,625,752) and Downey (U.S. Pat. Nos. 3,880,953 and 3,954,692) teach how to improve adhesion through use of specifically formulated tackifiers, and Freeman (U.S. Pat. No. 4,102,835) and Korpman (U.S. Pat. No. 4,136,071) use combinations of ABA and AB copolymers to extend the range of performance.

Psa systems which by their nature are adhesives which have an extremely delicate balance of properties known in the trade as the "fourfold" balance of adhesion, cohesion, stretchiness and elasticity are described in U.S. Pat. No. 2,884,176. The desire to maintain this balance of properties makes it extremely difficult to improve internal strength, i.e., the cohesiveness without also upsetting the other properties and destroying the overall pressure-sensitive nature of the adhesive system.

The prior art relating to "graft" copolymers does not deal with psa systems. The prior art related to "graft" copolymers is directed to modifying systems which are not pressure-sensitive and for purposes diametrically opposed to the teaching of the present application. The patents of Behrens (U.S. Pat. No. 3,004,958), Gregorian (U.S. Pat. No. 3,135,717), Milkovich (U.S. Pat. Nos. 3,786,116; 3,832,423; 3,862,267) teach how to graft side chains of polystyrene or acrylate esters onto rigid or semi-rigid backbones of polyvinyl chloride or methacrylate polymers to provide flexibility and temperature and impact resistance. Harlan (U.S. Pat. No.4,007,311) shows that grafting methyl methacrylate to a styreneisoprene-styrene block copolymer enhances adhesion without regard for elasticity or cohesiveness. In Ambrose (U.S. Pat. No. 4,075,186), a butadiene side chain is grafted to an acrylate polymer backbone to produce a molding material which has improved electrical properties and impact resistance but which is tack-free.

An acrylic psa having versatile processing capabilities and improved shear strength, to applicants' knowledge, is not known. Applicants herein teach the preparation of such an adhesive without sacrificing the outstanding optical clarity and resistance to oxidative and photochemical forces of the acrylic ester copolymer backbone.

STATE OF THE ART

In order to appreciate the level to which psa technology has risen from early crude psa tapes which were introduced a half century ago to the present sophisticated, specialized tapes which meet the demands of today's commerce and industry, one needs to understand the underlying physical-chemical basis for the delicate balance of properties which produces the psa coated flexible substrates of this invention. These are dealt with in a very fundamental way by Carl A. Dahlquist in a modern review of adhesion as an interdisciplinary science. See: *Interdisciplinary Science Reviews*, Vol. 2, No. 2, 1977. With this review, Mr. Dahlquist published a bibliography of literature which is as comprehensive as one will find in any publication dealing with adhesion technology.

An equally pertinent review, which appears in *Adhesives Age*, March 1982, deals specifically with acrylic polymers, their use in adhesives, and particularly pressure sensitive hot melt adhesive systems. This review also deals with the economic considerations as well as the environmental advantages these systems offer. It definitely points to the urgent need for systems which are environmentally safe but which must meet the adhesive performance criteria of today, without sacrificing the gains already made in this branch of adhesion science

DISCLOSURE OF THE INVENTION

The invention provides a normally tacky and psa composition and adhesive coated sheet materials having the requisite fourfold balance of adhesion, cohesion, stretchiness and elasticity. The adhesive composition also has good peel strength and tack properties plus excellent shear strength and creep resistance as well as excellent processability with or without solvent. For the most part, the adhesive compositions of the present invention have optical clarity and they are resistant to oxidative and photochemical degradation.

While acrylic polymeric psa compositions have been found to be more than adequate for many adhesive applications and have therefore gained great commercial success, there are many applications which require a higher shear strength psa composition than can be provided by the relatively soft acrylic polymeric psas. Such applications require a shear strength value of at least about 50 minutes, preferably much higher, i.e., on the order of 250–10,000 minutes.

Various ways of improving the shear strength of acrylic polymeric psas are known but each has its disadvantages. The molecular weight of the acrylic polymeric composition may be raised to improve shear strength but this generally produces a composition with poor processability. The polar monomer (e.g., acrylic acid) content may be increased but, with such increase, there is generally a loss of adhesive tack or quick stick. The acrylic polymeric composition may be crosslinked but this generally requires expensive equipment and the crosslinked composition also suffers from loss of quick stick and reduced processability.

According to the present invention, it has been discovered that the acrylic psas can be reinforced by chemical modification of the acrylic polymeric backbone to endow the acrylic polymeric material with such higher shear strength values. Such chemical modification is accomplished in the present invention by adding or grafting reinforcing polymeric moieties to the soft acrylic backbone to obtain the needed shear strength. The reinforcing polymeric moieties may be grafted by polymerizing monomer onto reactive sites located on the backbone, attaching preformed polymeric moieties to sites on the backbone, or by copolymerizing the acrylic monomer with preformed polymeric monomer.

The reinforcing polymeric moieties are characterized by being relatively stiff or hard, as compared to the acrylic polymeric backbone, by requiring that they have a glass transition temperature (hereinafter "$T_g$") of at least 20° C. and a weight average molecular weight of at least 2,000. By contrast, the acrylic backbone has a $T_g$ less than about $-20°$ C., usually less than about $-50°$ C.

It has been discovered that by such grafting of these reinforcing polymeric moieties, substantial increase in shear strength may be obtained in acrylic polymeric psas. The amount of grafting required depends upon the type of polymeric moiety, i.e., its molecular weight, $T_g$ and chemical type, and upon the amount of shear strength desired in the resultant polymer. A higher frequency of grafting with higher molecular weight grafts generally results in a more rapid increase in shear strength but care should be taken to avoid over reinforcement with the grafting polymeric moieties or else a decrease in adhesive tack may result. The present invention provides a unique advantage in that the polymeric adhesive compositions may be tailored to provide a desired shear strength by tailoring the grafting polymeric moieties and their frequency in the polymeric backbone.

In accordance with the invention, a normally tacky and psa composition comprises a polymer having in its backbone at least a major portion by weight of polymerized monomeric acrylic or methacrylic acid ester of a non-tertiary alcohol and grafted to the backbone polymeric moieties having a $T_g$ greater than about 20° C. and a weight average molecular weight above about 2,000. The number and composition of the attached polymeric moieties in the polymer is such as to provide a tape coated with the adhesive composition with a shear holding value of at least 50 minutes and the adhesive composition with an inherent viscosity greater than 0.2. The non-tertiary alcohol has from 1 to 14 carbon atoms with the average number of carbon atoms being 4–12.

Preferably the normally tacky psa composition comprises a copolymer having an inherent viscosity greater than 0.2 and consists essentially of copolymerized repeating units from A and C monomers and optionally B monomers. A is a monomeric acrylic or methacrylic acid ester of a non-tertiary alcohol, said alcohol having from 1 to 14 carbon atoms with the average number of carbon atoms being about 4–12. When used, B is at least one polar monomer copolymerizable with the monomeric acrylic acid ester. Preferred B monomers are acrylic acid, methacrylic acid, itaconic acid, acrylamide, methacrylamide, acrylonitrile and methacrylonitrile. The amount by weight of B monomer is up to 12% of the total weight of all monomers. C is a monomer having the general formula X—(Y)$n_n$—Z wherein X is a vinyl group copolymerizable with the A and B monomers. Y is a divalent linking group where n can be zero or one. Z is a monovalent polymeric moiety having a $T_g$ greater than 20° C. and a weight average molecular weight in the range of about 2,000 to 30,000 and being essentially unreactive under copolymerization conditions. The vinyl group of the C monomer and the A and B monomers are copolymerized to form a soft backbone having pendant therefrom the polymeric moieties. The weight of C monomer is within the range of about 1 to 30% of the total weight of all monomers in the copolymer. The total weight of the B and C monomers in said copolymer is within the range of about 4 to 30% of the total weight of all monomers in the copolymer.

In the preferred psa compositions of the present invention, the polymer has an inherent viscosity in the range of about 0.4 to about 2 to provide an optimum degree of adhesion and cohesion measured as shear strength. At inherent viscosities less than about 0.2, shear strength values of a more conventional nature as noted in the prior art are observed. At inherent viscosities greater than 2, for example as high as 4, copolymers have provided acceptable psas.

The psa coated sheet materials of the present invention are characterized by having a peel adhesion to glass value (as hereinafter defined) greater than about 10 Newtons per 100 mm and a shear strength (as hereinafter defined) greater than about 50 minutes A normally tacky and psa coated sheet material in accordance with the present invention comprises a backing member and a coating covering at least a portion of one major surface thereof of the above-defined pressure-sensitive composition.

BEST MODE FOR CARRYING OUT THE INVENTION

Monomer A, as previously mentioned, is a monomeric acrylic or methacrylic acid ester of a non-tertiary alcohol, said alcohol having from 1 to 14 carbon atoms with the average number of carbon atoms being about 4–12. Examples of such monomers include the esters of acrylic acid or methacrylic acid with non-tertiary alkyl alcohols such as 1-butanol, 1-pentanol, 2-pentanol, 3-pentanol, 2-methyl-1-butanol, 1-methyl-1-butanol, 1-methyl-1-pentanol, 2-methyl-1-pentanol, 3-methyl-1- pentanol, 2-ethyl-1-butanol, 3,5,5-trimethyl-1-hexanol, 3-heptanol, 2-octanol, 1-decanol, 1-dodecanol, and the like. Such monomeric acrylic or methacrylic esters are known in the art and many are commercially available.

As mentioned above, the B monomer is copolymerizable with the monomeric acrylic acid ester. Preferred B monomers are acrylic acid, methacrylic acid, itaconic acid, acrylamide, methacrylamide, acrylonitrile and methacrylonitrile. The B monomer is not necessary to produce the claimed psa composition but up to 12% of the total weight of all monomers of B monomer may be included. The preferred psa composition according to the present invention will contain from 2 to 8% by weight of B monomer of the total weight of all monomers.

The C monomer is a polymeric material having a copolymerizable vinyl group with which the A monomer and the B monomer will copolymerize under the polymerization conditions. The C monomer is represented by the general formula X—(Y)$_n$—Z wherein X is a vinyl group copolymerizable with the A and B monomers;

Y is a divalent linking group where n can be zero or one; and

Z is a monovalent polymeric moiety having a T$_g$ greater than 20° C. and a weight average molecular weight in the range of about 2,000 to 30,000 and being essentially unreactive under copolymerization conditions.

The preferred C monomer useful in the present invention may be further defined as having an X group which has the general formula

wherein R is a hydrogen atom or a COOH group and R' is a hydrogen atom or methyl group. The double bond between the carbon atoms provides a copolymerizable moiety capable of copolymerizing with the A and B monomers.

The preferred C monomer useful in preparing compositions according to the present invention includes a Z group which has the general formula

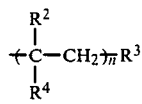

wherein R$^2$ is a hydrogen atom or a lower alkyl group, R$^3$ is a lower alkyl group, n is an integer from 20 to 500 and R$^4$ is a monovalent radical selected from the group consisting of

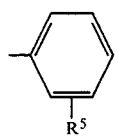

and —CO$_2$R$^6$ wherein R$^5$ is a hydrogen atom or a lower alkyl group and R$^6$ is a lower alkyl group.

Preferably, the C monomer has a general formula selected from the group consisting of

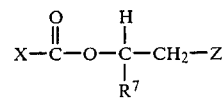

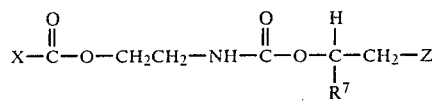

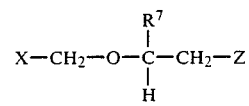

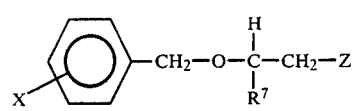

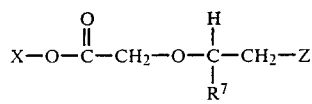

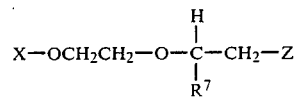

wherein R$^7$ is a hydrogen atom or a lower alkyl group.

The C monomer is a functionally terminal polymer, having a single functional group (the vinyl group) and is sometimes identified as a "semitelechelic" polymer. (Vol. 27 "Functionally Terminal Polymers Via Anionic Methods" D. N. Schultz et al, pages 427–440, *Anionic Polymerization,* American Chemical Society [1981].)

The vinyl-terminated polymeric monomer (C monomer), once polymerized with the acrylate monomer (A monomer) and polar monomer (B monomer), if used, forms a copolymer having pendant polymeric moieties which tend to reinforce the otherwise soft acrylate backbone, providing a substantial increase in the shear strength of the resultant copolymer adhesive composition. The amounts of C monomer set forth above indicate the level at which optimization of the shear strength value is noted. An excessive quantity of C monomer makes the resultant copolymer overly reinforced, decreasing its adhesive tack and making it more like a polymeric film rather than an adhesive composition. While certain of such compositions have utility as hot melt adhesives, they do not generally find utility as psa compositions.

The vinyl-terminated polymeric monomers useful in the present invention are sometimes known as macromolecular monomers (sometimes called "macromers"). Such monomers are known and may be prepared by the method disclosed by Milkovich et al as described in U.S. Pat. Nos. 3,786,116 and 3,842,059, the disclosures of which are incorporated herein by reference for the description of the preparation of the vinyl-terminated polymeric monomers. As disclosed therein, vinyl-terminated polymeric monomer is prepared by anionic polymerization of a polymerizable monomer to form a living polymer. Such monomers include those having an olefinic group, such as the vinyl-containing compounds. Living polymers are conveniently prepared by contacting the monomer with an alkali metal hydrocarbon or alkoxide salt in the presence of an inert organic diluent which does not participate in or interfere with the polymerization process Monomers which are susceptible to anionic polymerization are well known. Illustrative species include vinyl aromatic compounds such as styrene, alpha-methylstyrene, vinyltoluene and its isomers. Other monomers susceptible to anionic polymerization are also useful.

The initiators for anionic polymerization may be any of the alkali metal hydrocarbons or alkoxide salts which produce a mono-functional living polymer, i.e., only one end of the polymer contains a reactive ion. Such initiators include the hydrocarbons of lithium, sodium or potassium, for example, having an alkyl radical containing up to 20 carbon atoms or more, and preferably up to 8 carbon atoms. Illustrative alkali metal hydrocarbons include ethylsodium, propylsodium, butylpotassium, octylpotassium, phenylsodium, ethyllithium, butyllithium, sec-butyllithium, isobutyllithium, tert-butyllithium and 2-ethylhexyllithium. Sec-butyllithium is the preferred initiator.

The inert organic diluent utilized to facilitate heat transfer and adequate mixing of the initiator and monomer preferably is a hydrocarbon or an ether. Useful diluents include saturated aliphatic and cycloaliphatic hydrocarbons such as hexane, heptane, octane, cyclohexane and the like. In addition, aliphatic and cyclic ether solvents may be used, for example, dimethyl ether, diethyl ether, and tetrahydrofuran.

The amount of initiator usually dictates the molecular weight of the living polymer. If a small portion of initiator is used, with respect to the amount of monomer, the molecular weight of the living polymer will generally be larger than if a large portion of initiator is used. It is generally advisable to add initiator dropwise to the monomer until the persistence of the characteristic color of the organic anion is observed, then the calculated amount of the initiator is added for the molecular weight desired. The preliminary dropwise addition serves to destroy contaminants and thus permits better control of the polymerization. Generally, the initiator concentration can vary from about 0.01 to about 0.1 mole of active alkali metal per mole of monomer, or higher. Preferably, the concentration of the initiator will be from about 0.01 to about 0.04 mole of active alkali metal per mole of monomer.

The temperature of the polymerization will depend upon the monomer. Generally, the reaction can be carried out at a temperature ranging from about $-100°$ C. up to about $100°$ C.

The anionic polymerization must be carried out under controlled conditions so as to exclude substances which destroy the initiator or living anion. Water and oxygen must be excluded. The polymerization therefore is carried out under anhydrous conditions in an inert atmosphere such as nitrogen, helium or argon.

The living polymers may be terminated in several ways. It is important, however, that conditions be selected to provide a quantitative termination free from side reactions. Under certain conditions the living polymeric anion may be allowed to react directly with halogen-containing terminating agents to produce, for example, vinyl-terminated polymeric monomers. In many cases, however, the polymeric anion is highly reactive and non-selective in its reaction with the terminating agent. In addition to displacement of the halogen atom, it may abstract hydrogen atoms or react with other functional groups present, including the vinyl group itself. This results in polymer chains which are nonfunctional or of unwanted functionality and molecular weight. Occasionally, under these conditions, a vinyl-terminated polymer may be attacked by living anion and its functionality destroyed.

One means for overcoming the foregoing problem is to render the living anion less reactive, thus less susceptible to side reactions, by "capping" with a less reactive end group prior to actual termination. Examples of suitable "capping agents" include lower alkylene oxides such as ethylene and propylene oxide, and 1,1-diphenylethylene, etc. A preferred capping agent is an alkylene oxide, such as ethylene oxide. The capping agent reacts with the living polymer, destroying its oxirane ring. The alkoxide anion then displaces the halogen atom of the terminating agent selectively, leaving the vinyl group intact.

The capping reaction is carried out quite simply, as in the case of the terminating reaction, by adding the capping reactant to the living polymer at the polymerization temperature. The reaction occurs immediately As in the case of the termination reaction, a slight molar excess of the capping reactant with respect to the amount of initiator may be used. The reaction occurs on a mole for mole basis. This reaction is described in Milkovich, U.S. Pat. No. 3,842,059. Reaction with the terminating agent provides the desired vinyl-terminated polymeric monomer.

A second method of termination, also useful for synthesis of the vinyl-terminated polymeric monomers, involves capping the living anion performed as described previously, and then protonating the alkoxide ion to produce a hydroxyl-terminated polymer The hydroxyl group is then allowed to react with a terminating agent containing an isocyanate group (instead of a halogen atom) to produce the vinyl termination. Suitable terminating agents for this reaction are isocyanato alkyl acrylates and methacrylates having 1 to 4 carbon atoms in the alkyl group. The hydroxyl and isocyanato groups react to form a urethane linkage between the polymeric segment and the "monomeric" end group. Intermediate protonation of the alkoxide is necessary to prevent unwanted side reactions upon termination.

Although U.S. Pat. No. 3,786,116 teaches that the molecular weight distribution of the polymer chains of the vinyl-terminated polymeric monomer prior to copolymerization must be narrow, i. e., less than 1.1 polydispersity, it has been found that useful psa compositions according to the present invention may employ polymeric monomer having a polydispersity of up to about 3 without deleterious effects on the adhesive properties. These broader molecular weight distributions may be obtained by known variations in temperature of polymerization and the lithium alkali initiator used.

The vinyl-terminated polymeric monomers useful in the present invention may also be prepared by free-radical polymerization (rather than anionic polymerization). Known methods can be used to prepare semitelechelic polymers using thermal free-radical initiators. An illustrative method is described in Y. Yamashita, K. Ito, H. Mizuno and H. Okada, Polymer Journal 14, 255–260 (1982) and K. Ito, N. Usami, and Y. Yamashita, Macromolecules 13, 216–221 (1980). These functional polymers can then be converted into vinyl-terminated monomers using standard condensation chemistry, ring opening reactions, etc. Specifically, carboxylic-acid terminated low molecular weight polystyrene can be prepared using 4,4'-azobis-(4-cyanovaleric acid) as an initiator and an acid-containing chain transfer agent such as HS-CH$_2$-COOH. The semi-telechelic polystyrene can then be vinyl terminated via, for example, ring opening of glycidyl methacrylate. These vinyl-terminated polymers have a high polydispersity.

The copolymerization of the A monomer, B monomer, if used, and C monomer is by conventional free radical polymerization, for example, as described by Ulrich, U.S. Re. Pat. No. 24,906. The monomers are dissolved in a suitable inert organic solvent and polymerized by standard free radical polymerization utilizing a suitable free radical initiator. Suitable free radical initiators which may be utilized include azo compounds such as 2,2'-azobis(isobutyronitrile), hydroperoxides such as tert-butyl hydroperoxide, peroxides such as benzoyl peroxide or cyclohexanone peroxide. Generally, from about 0.01 to about 5% by weight of thermally activatable initiator based upon the total polymerizable composition is used.

The organic solvent utilized in the latter free radical polymerization may be any organic liquid which is inert to the reactants and product and will not otherwise adversely affect the reaction. Suitable solvents include ethyl acetate and mixtures such as ethyl acetate with toluene, heptane with toluene and isopropyl alcohol and heptane with toluene and methyl alcohol. Other solvent systems are useful. The amount of solvent is generally about 30-80% by weight based on the total weight of the reactants and solvent. In addition to solution polymerization herein described, said copolymerization may be carried out by other well known techniques such as suspension, emulsion and bulk polymerization.

As described above, the preferred grafting technique involves copolymerization of monomer A, B (if used) and C with C being chemically tailored macromolecular monomer of controlled molecular weight and selected to have a T$_g$ sufficiently high to optimize the shear strength of the soft, compliant acrylic backbone. Other polymer grafting techniques may also be employed to produce the improved shear strength polymeric psa compositions of the invention. Each of the grafting methods provides a high degree of predictability of the properties of the end product.

An alternative grafting technique involves preforming the soft, compliant, acrylic polymeric backbone, then copolymerizing the preformed polymeric backbone with monomer to produce high T$_g$ polymeric moieties on the backbone to obtain the desired shear strength. Such a composition may be obtained, for example, by grafting methyl methacrylate monomer to a preformed isooctyl acrylate/dimethylaminoethyl methacrylate polymeric backbone.

Another equally effective approach is to graft preformed high T$_g$ polymeric moieties to a preformed soft, compliant acrylic polymeric backbone. Such a composition may be obtained, for example, by grafting hard hydroxy-terminated polystyrene moieties to a preformed acrylic polymer backbone.

These and other useful polymer grafting techniques are well known as described in overview in Chapter 2, pages 13-16 *Block Copolymers* by Noshay and McGrath, Academic Press (1977) and in greater detail in *Graft Copolymers*, Battaerd and Tregear, J. Wiley & Sons (1967).

The adhesive copolymer compositions prepared in accordance with the present invention are easily coated upon suitable flexible or inflexible backing materials by conventional coating techniques to produce coated adhesive sheet materials in accord with the present invention. The flexible backing material may be any material conventionally utilized as a tape backing or any other flexible material. Typical examples of flexible backing materials employed as conventional tape backings which may be useful for the adhesive compositions of the present invention include those made of paper, plastic films such as polypropylene, polyethylene, polyvinyl chloride, polyester (e.g., polyethylene terephthalate), cellulose acetate and ethyl cellulose.

Backings may also be prepared of fabric such as woven fabric formed of threads of synthetic or natural materials such as cotton, nylon, rayon, glass, ceramic material, and the like or nonwoven fabric such as air laid webs of natural or synthetic fibers or blends of these. The backing may also be formed of metal, metalized polymeric films, or ceramic sheet materials. The coated sheet materials may take the form of any article conventionally known to be utilized with psa compositions such as labels, tapes, signs, covers, marking indicia, and the like.

The psa compositions of the present invention may be coated by any of a variety of conventional coating techniques such as roll coating, spray coating, curtain coating, and the like. The psa compositions may also be coated without modification by extrusion coating, coextrusion, hot-melt coating and the like by employing suitable conventional coating devices for this purpose. Primers may be used but they are not always necessary.

It should be noted that, while the adhesives of the present invention are imparted improved shear strength without subsequent crosslinking, if necessary, further solvent resistance and resistance to photochemical or oxidative forces may be obtained by crosslinking by employing radiant energy or chemical procedures without upsetting the "fourfold" balance of adhesive properties.

EXAMPLES

The following detailed description includes exemplary preparations of vinyl-terminated polymeric monomer (C monomer) and various copolymer adhesive compositions prepared with the various A, B and C monomers. The A and B monomers are set forth hereinafter in Table I. The C monomers are identified as C-1 through C-17 and described in specific detail in Table II. Examples 1–74 of psa coapositions made according to the present invention are set forth in Table III. Other numbered examples follow Table III. All parts in the examples are by weight unless otherwise specified.

DEFINITION OF TERMS

The number-average molecular weight ($\overline{M}_n$), weight-average molecular weight ($\overline{M}_w$), and Z-average molecular weight ($\overline{M}_z$) are well known mathematical descriptions of the molecular weight distribution of a polymer sample.

The polydispersity, abbreviated "p", is a measure of the molecular weight distribution of a polymer and is defined as $\overline{M}_w/\overline{M}_n$.

Each of the foregoing is a well known term used by polymer chemists and others. Further explanation of the derivation of these terms may be found in *Experimental Methods in Polymer Chemistry*, Wiley and Sons, 1981, Chapter 3 entitled "Molecular Weight Averages", pages 57–61.

TEST METHODS

The test methods used to evaluate the psa coated flexible sheet materials of the examples are industry standard tests. The standard tests are described in detail in various publications of the American Society for Testing and Materials (ASTM), Philadelphia, Pa. and the Pressure Sensitive Tape Council (PSTC), Glenview, Ill. The standard test methods are described in detail below. The reference source of each of the standard test methods is also given.

SHEAR STRENGTH (Reference: ASTM: D3654-78; PSTC-7)

The shear strength is a measure of the cohesiveness or internal strength of an adhesive. It is based upon the amount of force required to pull an adhesive strip from a standard flat surface in a direction parallel to the surface to which it has been affixed with a definite pressure. It is measured in terms of time (in minutes) required to pull a standard area of adhesive coated sheet material from a stainless steel test panel under stress of a constant, standard load.

The tests were conducted on adhesive coated strips applied to a stainless steel panel such that a 12.5 mm by 12.5 mm portion of each strip was in firm contact with the panel with one end portion of the tape being free. The panel with coated strip attached was held in a rack such that the panel forms an angle of 178° with the extended tape free end which is then tensioned by application of a force of one kilogram applied as a hanging weight from the free end of the coated strip. The 2° less than 180° is used to negate any peel forces thus insuring that only the shear forces are measured in an attempt to more accurately determine the holding power of the tape being tested. The time elapsed for each tape example to separate from the test panel is recorded as the shear strength.

PEEL ADHESION (Reference: ASTM D3330-78 PSTC-1 (11/75)

Peel adhesion is the force required to remove a coated flexible sheet material from a test panel measured at a specific angle and rate of removal. In the examples, this force is expressed in Newtons per 100 mm (N/100 mm) width of coated sheet. The procedure followed is:

1. A 12.5 mm width of the coated sheet is applied to the horizontal surface of a clean glass test plate with at least 12.7 lineal cm in firm contact. A hard rubber roller is used to apply the strip.

2. The free end of the coated strip is doubled back nearly touching itself so the angle of removal will be 180°. The free end is attached to the adhesion tester scale.

3. The glass test plate is clamped in the jaws of a tensile testing machine which is capable of moving the plate away from the scale at a constant rate of 2.3 meters per minute.

4. The scale reading in Newtons is recorded as the tape is peeled from the glass surface. The data is reported as the range of numbers observed during the test.

INHERENT VISCOSITY MEASUREMENT In order to understand the benefits derived from the teachings of this invention, it is necessary to relate the improvements in shear strength and processability to the molecular weight of the adhesive and of the polymeric monomer which is incorporated into the adhesive. For this purpose, the measurement of the viscosity of dilute solutions of the adhesive clearly demonstrates the degree of improvement when compared to controls run under the same conditions. It is the comparative values which are significant and absolute figures are not required.

The inherent viscosity is measured by conventional means using a Cannon-Fenske #50 viscometer in a water bath controlled at 25° C. to measure the flow time of 10 ml of a polymer solution (0.2 g per deciliter polymer in ethyl acetate). The examples and control examples being run for comparison were run under identical conditions.

GEL PERMEATION CHROMATOGRAPHY

The characterization of the molecular weight distribution of the polymeric monomers and the psas which utilize the polymeric monomers to provide pendant reinforcing moieties has been by conventional gel permeation chromatography (GPC).

A Hewlett-Packard Model 1084B, high performance liquid chromatograph equipped with six (6) ultra STYRAGEL® columns of sizes $10^6$Å, $10^5$Å, $10^4$Å, $10^3$Å, 500Å and 100Å was used for all determinations. Samples were pretreated with diazomethane in diethyl ether. After drying, the samples were dissolved in tetrahydrofuran at a concentration of 0.25% (W/V) and filtered through a 0.5 micrometer polytetrafluoroethylene filter. Examples were injected at volumes of 170 μl to 200 μl and eluted at a rate of 1 ml per minute through the columns maintained at 40° C. Tetrahydrofuran was used as the solvent. The differential refractometer detector was a Hewlett-Packard Model 79877A and the UV detector was a Hewlett-Packard Model 79875A. The system was calibrated using polystyrene standards and employing a linear least squares fit. All GPC calculations were performed on a Hewlett-Packard Model 3388 integrator and all molecular weight averages are polystyrene equivalent molecular weights. The molecular weight averages and polydispersities were calculated according to accepted practices. GPC test methods are further explained in "Modern Size Exclusion Liquid Chromatography" *Practice of Gel Permeation Chromatography* John Wiley and Sons, 1979.

"C" MONOMER PREPARATION

Polymeric vinyl-terminated monomer, identified in the claims and herein as the "C" monomer, is prepared as described below.

The "C" monomers are identified in the foregoing descriptions and in the tables as "C" Monomers "C-1"–"C-17". Specific detail of the repeating monomeric unit ("Repeating Unit"), chemical type of termination ("Termination"), the weight average molecular weight (rounded to the nearest thousand) ("Molecular Weight") and polydispersity ("Polydispersity") are given in Table II.

MONOMER "C-1"

A methacrylate-terminated polystyrene polymeric monomer having an average molecular weight of about 4000 was prepared. A 5 liter, four-necked flask, fitted with a thermometer, mechanical stirrer, septum, Dean-Stark trap and condenser was charged with 2400 ml reagent grade cyclohexane and the cyclohexane heated therein to reflux under a slow argon stream. A small portion (200 ml) of the cyclohexane was removed through the trap to eliminate water from the system, leaving approximately 2200 ml (1694 g) cyclohexane.

Styrene monomer was first purified by passing over 200 mesh silica gel under argon and then 100 ml (89.2 g) of this styrene monomer was introduced into the reaction flask by syringe through the septum to produce a 5% by weight solution of styrene monomer in cyclohexane. About 5 to 10 drops of a 1.1 molar solution of sec-butyllithium in cyclohexane was added dropwise to the monomer solution (which had been permitted to cool to about 50° C.) until a faint yellow color persisted, indicating completion of reaction with impurities. Then 16.2 ml (17.8 meq sec-butyllithium) of the solution was added rapidly, causing an exothermic reaction. The flask contents were maintained at 65° C. by cooling. Polymerization was substantially complete after approximately 1 hour and after such time the temperature was permitted to cool to 35° C. Ethylene oxide gas was introduced over the reaction mixture and the solution was rapidly agitated for 15 minutes until the orange color of the polystyryllithium had completely disappeared. The reaction was then quenched with 5 ml (5.7 g) of freshly distilled methacryloyl chloride, permitted to cool to room temperature and stirred for 1 hour at room temperature.

The resultant crude polymer solution was then reduced in volume to approximately one-third and added dropwise to a large excess of isopropanol. The precipitated polymer was collected on a large sintered glass funnel, dried overnight under ambient conditions, further dried at 65° C. for 24 hours in a forced air oven and finally completely dried in vacuo.

Gel permeation chromatography revealed a number average molecular weight ($\overline{M}_n$) of 3837 and a weight average molecular weight ($\overline{M}_w$) of 4448, resulting in a polydispersity (p) of 1.16.

MONOMER "C-2"

A methacrylate-terminated polystyrene polymeric monomer having an average molecular weight of about 9000 was prepared, generally following the procedure set out above for the preparation of Monomer "C-1". In the preparation of this monomer, however, 150 g (1.44 moles) of styrene were charged into a 3 liter Morton flask containing 1155 grams cyclohexane, resulting in an 11.5% by weight solution. The solution was heated to about 50° C. and a 1.4 molar solution of sec-butyllithium in cyclohexane was added dropwise until a faint yellow color persisted, then 10.7 ml of additional sec-butyllithium cyclohexane solution were added rapidly. The reaction mixture was maintained at 65° C. by cooling. After about 1 hour, the solution was allowed to cool to 35° C. and then ethylene oxide gas was introduced over the reaction mixture which was agitated rapidly for 15 minutes until the orange color of polystyryllithium had disappeared. The reaction was then quenched with 5 ml (51.2 meq) of methacryloyl chloride. The polymer solution was reduced in volume and the polymer precipitated and dried as described above. Gel permeation chromatography revealed a number average molecular weight of 8394, weight average molecular weight 8842 and polydispersity of 1.05.

MONOMER "C-3"

An acrylate-terminated polystyrene polymeric monomer having an average molecular weight of about 12,000 was prepared according to the procedure utilized in the preparation of Monomer "C-1" described above. Styrene monomer (262.5 g) was added to 2500 ml (1925 g) of cyclohexane, resulting in a 12% by weight solution. A 1.4 molar solution of sec-butyllithium in cyclohexane (16.2 ml) was added to the monomer solution and the reaction was permitted to proceed as described for Monomer "C-1". The reaction was quenched with 5 ml (5.7 g) freshly distilled acryloyl chloride. Analytical results of the resultant polymer were as follows: $\overline{M}_n$ 10,249, $\overline{M}_w$ 13,748 and p 1.34.

MONOMER "C-4(a)"

A methacrylate-terminated polystyrene polymeric monomer having an average molecular weight of 20,000 was prepared. A flame-dried 5 liter glass 5-necked flask equipped with a mechanical stirrer, gas inlet, condenser, addition funnel and thermometer and purged with dry argon, was charged with 2100 g cyclohexane which had previously been distilled from polystyryl lithium. The cyclohexane was heated to 50° C. and 20 ml of a 1.17 molar solution of sec-butyllithium in cyclohexane (23.4 millimoles) were added to the flask via a syringe. Purified styrene monomer (350 g) was added in one portion to the flask, resulting in an exothermic reaction. The temperature was maintained at less than 74° C. by cooling and then, during the next hour, the reaction mixture was maintained at approximately 50° C. Thereafter, the mixture was cooled to 40° C. and ethylene oxide previously passed over sodium hydroxide was introduced with vigorous stirring until the red color of polystyryllithium had changed to a faint yellow. Thereupon the reaction was quenched with 1.4 g (23.4 millimoles) acetic acid. The reaction mixture was saturated with dry air, 10.9 g (70.2 millimoles) 2-isocyanatoethyl methacrylate and 4 drops of tin dioctoate catalyst were added, and the resultant mixture was heated to 60° C. and maintained at that temperature for 14 hours.

The mixture was then cooled and the polymer was precipitated in 30 liters of methanol, dried in vacuo, to yield 340 g (97% yield) methacrylate-terminated polystyrene monomer having a number average molecular weight of 16,700, weight average molecular weight of 18,036 and a polydispersity of 1.08.

MONOMER "C-4(b)"

A methacrylate-terminated polystyrene polymeric monomer having an average molecular weight of about 10,000 was prepared. The procedure was the same as that used to prepare Monomer "C-4(a)" except that the amounts of lithium initiator and styrene monomer were selected to produce a polymeric monomer of about half the C-4(a) molecular weight, i.e., 10,000 of the polymeric Monomer "C-4(a)". The monomer produced was analyzed by gel permeation chromatography which gave the following results: $\overline{M}_n$ 9,600; $\overline{M}_e$ 10,464 and a polydispersity of 1.09.

MONOMER "C-5"

Acrylate-terminated poly(t-butylstyrene) polymeric monomer having an average molecular weight of about 12,000 was prepared. Tert-butylstyrene, 162 ml (143.2 g) was added to 2500 ml cyclohexane under anhydrous conditions in the reaction flask producing a 6.9 weight percent solution of monomer in the solvent. Approximately 5 to 10 drops of a 1.25 molar solution of sec-butyllithium in cyclohexane were added to the monomer solution to remove impurities and then 11.8 ml (14.7 meq) of the sec-butyllithium were rapidly added, resulting in an exothermic reaction. The temperature was maintained at 65° C. by cooling. Upon completion of the reaction, the mixture was permitted to cool to 35° C., ethylene oxide gas was introduced to substantially react with the polystyryllithium and the resultant mixture was quenched with 5 ml acryloyl chloride (5.7 g, 63 meq). The solution volume was reduced and added as described above to isopropanol to precipitate the polymer which was collected and dried. Analytical results were as follows: $\overline{M}_n$ 11,130, $\overline{M}_w$ 12,570 and polydispersity 1.13.

MONOMER "C-6"

Acrylate-terminated poly(alpha-methylstyrene) polymeric monomer was prepared. Alpha-methylstyrene (498 g) was added to 2.5 liters of dried tetrahydrofuran, the resultant solution titrated with 1.4 N sec-butyllithium in cyclohexane solution until a persistent orange color was reached and then, while the flask contents were at ambient temperature (23° C.), 65 ml of the sec-butyllithium solution (91 meq) were added all at once, causing an exothermic reaction. The temperature rose to 26° C. The temperature was lowered to −70° C. by cooling in a dry ice-2-propanol bath and the −70° C. temperature was maintained for 45 minutes. Liquid ethylene oxide (15 g) was then added with no observed reaction taking place. The cooling bath was removed and the reaction mixture permitted to warm to −30° C. at which point the ethylene oxide reacted with the living anion and the color changed from blood red to clear. The reaction mixture was terminated by addition of 30 g of acryloyl chloride with the temperature of the mixture being maintained at 0° C. The resulting polymer was precipitated in 2-propanol and dried. Analytical results: $\overline{M}_n$ 6,321, $\overline{M}_w$ 10,632, p. 1.68.

An acrylate-terminated polystyrene polymeric monomer having an average molecular weight of about 22,000 was prepared. An 11.3% by weight solution of 270 ml (245.7 g) styrene monomer in 2500 ml (1925 g) cyclohexane was prepared and to the solution was added 9.8 ml of 1.25 molar solution of sec butyllithium (12.3 meq) according to the procedure set out for Monomer "C-1" to produce a polymeric monomer having $\overline{M}_n$ 20,231, $\overline{M}_w$ 24,722 and p 1.22.

MONOMER "C-8"

A methacrylate-terminated polystyrene polymeric monomer having a molecular weight of about 30,000 was prepared employing 1800 ml (1386 g) dried cyclohexane, 268 ml (244 g) styrene, 7.4 ml of a 1.1 molar solution of sec-butyllithium in cyclohexane (8.13 meq) and quenching with 7.5 ml of methacryloyl chloride. The polymeric monomer had $\overline{M}_n$ 22,371, $\overline{M}_w$ 26,855 and p 1.20.

MONOMERS "C-9" - "C10" - "C-11"

Methacrylate-terminated polystyrene polymeric monomers of high polydispersity were prepared by the following procedure: A 2 liter, three-necked Morton flask was charged with 700 ml of cyclohexane which was concentrated to 600 ml under an argon stream. The cyclohexane was allowed to cool to room temperature, then 75 ml of styrene (68.2 g) were added by syringe. Then 6 ml of a 1.25 M solution of sec-butyllithium in cyclohexane diluted with 25 ml of cyclohexane were added dropwise to the styrene solution which was held at 45° C. The addition was completed in 15 minutes after which the reaction mixture was stirred an additional 10 minutes and allowed to return to room temperature. Ethylene oxide was then added by syringe with rapid stirring of the solution until the mixture was water white. At that point, 2 ml of methacryloyl chloride were added. The resulting solution was reduced to ½ volume and then poured rapidly into 2-propanol (800 ml) to precipitate the product which was dried. This procedure was followed for two additional monomer preparations. The amounts of initiator and the addition times were altered to produce larger or smaller molecular weight ranges as desired. As a result of these preparations, three methacrylate-terminated polystyrene polymeric monomers of high polydispersity were prepared:

| Monomer | Repeating Unit | Termination | Molecular Weight | Polydispersity |
|---|---|---|---|---|
| C-9 | Styrene | Methacrylate | 18,000 | 1.94 |
| C-10 | Styrene | Methacrylate | 20,000 | 1.92 |
| C-11 | Styrene | Methacrylate | 22,000 | 2.26 |

MONOMER "C-12"

A methacrylate-terminated polystyrene polymeric monomer having an average molecular weight of about 18,000 was produced using a free radical technique.

Styrene monomer, 300 g, 2.88 moles, thioglycolic acid (mercaptoacetic acid), 15 g, and xylene, 300 g, were combined in a nitrogen-purged 1 liter split resin flask and heated to 105° C. with rapid stirring. A solution of 12 g 4,4'-azobis(4-cyanovaleric acid), 98% active, dissolved in 80 ml of tetrahydrofuran was added dropwise to the flask over a period of 2 hours. After 30 minutes of additional heating at 105° C. 0.5 g of hydroquinone was added and the flask flushed with air. The reaction mixture was cooled to room temperature and the product was precipitated into 2-propanol, redissolved in tetrahydrofuran, reprecipitated into 2-propanol, filtered and dried. The product, 25 g, 2.5 meq COOH, was placed in a 500 ml round bottom flask and dissolved in 100 g of xylene. N,N-dimethyl benzyl amine, 0.5 g, and glycidyl methacrylate (1 g, 7.5 meq) were added to the flask and the mixture was stirred and heated to reflux for 4 hours. Thereafter, the mixture was cooled to room temperature and the resultant polymer was precipitated in 2-propanol, redissolved in tetrahydrofuran and again precipitated in 2-propanol. The polymer was then dried in vacuo overnight at 60° C. and analyzed with results as follows: $\overline{M}_n$ 8,792, $\overline{M}_w$ 17,503 and p 1.99.

MONOMER "C-13"

A methacrylate-terminated polyvinyl toluene polymeric monomer having an average molecular weight of 10,000 was prepared according to the procedure set out for Monomer C-1. The charge to the reaction flask was 1,750 ml cyclohxane, 165 ml vinyltoluene and 11 ml 1.4 molar sec-butyllithium-cyclohexane solution, using 4 ml of methacryloyl chloride to quench. Polymer analysis results were as follows: $\overline{M}_n$ 9,132, $\overline{M}_w$ 10,096 and p 1.11.

MONOMER "C-14"

An acrylate-terminated polymethyl methacrylate polymeric monomer having an average molecular weight of 10,000 was prepared. Recrystallized dried fluorene, five parts, was placed in a 1,000 ml 3-necked flask fitted with stirrer, thermometer, argon inlet and rubber septum, all of which had been previously flamed under argon. Dried tetrahydrofuran, 400 parts, was distilled into the flask and 15 parts of a 1.4 N solution of sec-butyllithium in cyclohexane were added through the septum, producing an orange-red solution of fluorenyl lithium under slight argon pressure. The flask contents were cooled to −76° C. and 65 parts dried, freshly distilled methyl methacrylate were rapidly added through the septum. The reaction temperature quickly rose to −20° C. and then was gradually returned to −76° C. by cooling. After one hour of stirring, 3 parts of ethylene oxide were bubbled into the flask and the flask was warmed to −10° C. causing the liquid to change from orange-red to light yellow. Acryloyl chloride (3 parts) was then added to quench. The reaction mixture was then warmed to room temperature and added dropwise with vigorous stirring to 4 liters of hexane, causing a white solid to precipitate. The solid was filtered, dried, redissolved in toluene, filtered to remove impurities and precipitated in methanol. The resulting white solid was a polymeric monomer having the following properties: Weight average molecular weight 10,420 and polydispersity 2.6.

MONOMER "C-15"

A vinyl-terminated polymethyl methacrylate polymeric monomar was prepared. Recrystallized and dried fluorene (0.83 part) was placed into a previously flamed-dried 500 ml 4-necked flask fitted with a stirrer, thermometer, argon inlet and rubber septum. Tetrahydrofuran (200 parts) was distilled from potassium ketyl into the flask and 3 parts of a 1.4 N solution of sec-butyllithium in cyclohexane were added, resulting in an orange-red solution. The flask contents were cooled to −76° C. and 50 parts of methyl methacrylate were added dropwise over 30 minutes while maintaining the temperature between −76° C. and −70° C. This temperature was maintained an additional 10 minutes with stirring. Allyl bromide (1.0 part) was added and stirring continued for 3 hours, while maintaining the same temperature. The flask contents were then permitted to warm to room temperature and the product was isolated by dropwise addition of the solution to 2 liters of hexane. The resultant white solid was isolated by filtration and dried. Analysis revealed an average molecular weight of 13,867 and a polydispersity of 1.2.

MONOMER "C-16"

A polymethyl methacrylate polymeric monomer was prepared following the procedure outlined for Monomer "C-14". At the point where enough methyl methacrylate had been added and permitted to react to molecular weight of about 7,000 with a polydispersity of 4.1. This monomer has no terminal vinyl group as determined by end group analysis and is referred to as a "dead" monomer. It did not react chemically when attempts to copolymerize with isooctyl acrylate were subsequently carried out.

MONOMER "C-17"

A methacrylate-terminated copolystyrene/t-butyl styrene monomer having a molecular weight of 10,000 was prepared. A dry 5-necked 5-liter flask equipped with a Dean-Stark trap, condenser, addition funnel, thermometer, inlet tube, and mechanical stirrer was charged with 2260 g cyclohexane. The cyclohexane was heated to reflux under argon and 200 ml removed by distillation. When the temperature of the cyclohexane had cooled to about 45° C., sec-butyllithium (27.8 ml of 1.1 M solution in cyclohexane, 0.031 mole) was added followed by a solution of styrene (275.5 g) and t-butyl styrene (49.1 g). The monomers were previously purified by passing them through silica gel and then alumina. An exothermic reaction resulted with the maximum temperature reaching 72° C. while cooling with an ice bath. After 1 hour, excess ethylene oxide (passed over NaOH pellets) was introduced with vigorous stirring at a reaction temperature of about 40° C. The mixture was quenched with acetic acid (0.031 mole).

After cooling to room temperature, the reaction mixture was saturated with dry air and treated with 2-isocyanatoethyl methacrylate (11.2 g, 0.0720 mole) and dibutyl tin dilaurate (4 drops) catalyst. At the end of 14 hours the mixture was precipitated into methanol to give 278 g of the product ($\overline{M}_n = 8450$; p=1.09).

EXAMPLE 1

A control adhesive example consisting of a copolymer of 95 parts isooctyl acrylate and 5 parts acrylic acid was prepared.

In a glass reaction bottle was placed 17 grams isooctyl acrylate, 1.0 gram acrylic acid, 2.0 grams of a stock solution consisting of 0.5 g carbon tetrabromide and 99.5 g isooctyl acrylate, 30 grams of ethyl acetate and 0.06 grams of 2,2'-azobis(isobutyronitrile) free radical initiator available under the trade designation "VAZO" 64 from the E.I. DuPont Company. The reaction bottle was purged with nitrogen and sealed. The reaction bottle was placed in a 55° C. bath and tumbled therein for 24 hours to produce a polymer which had an inherent viscosity of 0.71. The polymer was coated onto a 37 micrometer polyester film to provide a dry coating thickness of 25 micrometers. The coated film was equilibrated for 16 hours and thereafter tested under constant temperature and humidity. Test results are shown in Table III.

EXAMPLE 2

A control copolymer adhesive composition consisting of 90 parts isooctyl acrylate and 10 parts acrylic acid having an inherent viscosity of 0.78 was prepared employing the technique described in Example 1. Instead of using 5 parts of acrylic acid, however, 10 parts acrylic acid were used to prepare this copolymer. The reaction bottle was charged with 16 grams isooctyl acrylate, 2.0 grams acrylic acid, 2.0 grams of the stock solution used in Example 1, 30 grams ethyl acetate and 0.06 grams free radical initiator. Test results are shown in Table III.

EXAMPLES 3-10

Psa compositions consisting of copolymers of isooctyl acrylate, acrylic acid and varying amounts of methacrylate-terminated polymeric monomer identified above as "Monomer C-1" were prepared. In a glass reaction bottle, the methacrylate-terminated polymeric monomer was combined with the isooctyl acrylate, acrylic acid, 30.0 grams of ethyl acetate, and 0.06 grams initiator ("VAZO" 64). The bottle was purged with nitrogen, sealed, tumbled in a 55° C. water bath for 24 hours and the resulting adhesive compositions coated on a 37 micrometers polyester film to a dry thickness of 25 micrometers and tested.

The amounts of methacrylate-terminated polymeric monomer (C), isooctyl acrylate (A), and acrylic acid (B) are shown below:

| Example No. | Monomer "A" | "B" | "C-1" | I.V. | Shear (Minutes) | Peel N/100 mm | |
|---|---|---|---|---|---|---|---|
| 3 | 90.5 | 6.5 | 3.0 | — | 26 | 66 | |
| 4 | 87.5 | 6.5 | 6.0 | 0.87 | 540 | 48–53 | S |
| 5 | 84.5 | 6.5 | 9.0 | 0.84 | 3,234 | 50 | |
| 6 | 81.5 | 6.5 | 12.0 | 0.81 | 4,474 | 18–48 | S |
| 7 | 78.5 | 6.5 | 15.0 | — | 8,186 | 0–66 | VS |
| 8 | 73.5 | 6.5 | 20.0 | — | 10,000+ | 4–61 | VS |
| 9 | 88.0 | 3.0 | 9.0 | 0.80 | 158 | 70 | |
| 10 | 82.0 | 3.0 | 15.0 | — | 544 P.O. | 50 | |

S = Shocky;
VS = Very Shocky;
P.O. = Pop off

These examples show shear strength improvement brought about by increasing "C-1" to levels where shockiness is reached. They also show how adhesion can be improved at the expense of shear strength by decreasing acrylic acid while holding Monomer "C-1" at modest level.

EXAMPLE 11

Monomer "C-2" (MW 9000) which is more than double the molecular weight of "C-1" in Examples 3–10, was copolymerized with isooctyl acrylate (A) and acrylic acid (B) by the same procedure used in Examples 3–10.

| Example No. | Monomer "A" | "B" | "C" | I.V. | Shear (Minutes) | Peel N/100mm |
|---|---|---|---|---|---|---|
| 11 | 87.5 | 6.5 | 6.0 | 0.79 | 3,073 | 59 |

Compared to Example 4 above, which has the same ratios of A:B:C monomers and approximately the same inherent viscosity, it becomes apparent that doubling the molecular weight of the "C" monomer graft increases the shear strength 6 times.

EXAMPLE 12

A psa composition consisting of 89.3 parts isooctyl acrylate, 4.7 parts acrylic acid and 6 parts vinyl-terminated polymeric monomer C-3 was prepared by following the procedure described in Examples 3–10 above, employing the following ingredients:

| Ingredient | Parts By Weight |
|---|---|
| Isooctyl acrylate | 89.3 |
| Acrylic acid | 4.7 |
| Monomer C-3 | 6.0 |

See Table III for shear and adhesion values.

EXAMPLES 13–17

Various copolymer psa compositions were prepared employing vinyl-terminated polymeric monomer C-4(b), according to the procedure described in Examples 3–10.

| Ex. No. | Isooctyl Acrylate (%) | Acrylic Acid (%) | Vinyl-Terminated Polymeric Monomer (%) |
|---|---|---|---|
| 13 | 90 | none | 10 |
| 14 | 85 | none | 15 |
| 15 | 80 | none | 20 |
| 16 | 76 | 4 | 20 |
| 17 | 81 | 4 | 15 |

The resultant adhesives were coated onto 50 micrometers polyester film and tested as described above. Results, shown in Table III, reveal the dramatic enhancement of the shear strength and peel strength by the addition of small amounts of acrylic acid.

EXAMPLES 18–27

The effect of adding varying amounts of vinyl-terminated polymeric monomer C-4(a) with isoctyl acrylate and acrylic acid is noted in the following examples. These results show the synergistic effect of combining small amounts of acrylic acid with the macromer. For shear and adhesion values see Table III.

| Ex. No. | Isooctyl Acrylate (%) | Acrylic Acid (%) | Vinyl-Terminated Polymeric Monomer (%) |
|---|---|---|---|
| 18 | 94 | 2 | 4 |
| 19 | 91 | 2 | 7 |
| 20 | 91 | 5 | 4 |
| 21 | 88 | 2 | 10 |
| 22 | 88 | 5 | 7 |
| 23 | 88 | 8 | 4 |
| 24 | 90 | 4 | 6 |
| 25 | 89 | 3 | 8 |
| 26 | 89 | 3 | 8 |
| 27 | 89 | 3 | 8 |

EXAMPLES 28–30

The effect of the backbone molecular weight (correlated by inherent viscosity) upon the psa adhesive properties of the copolymer is demonstrated by holding constant the amount of vinyl-terminated polymeric monomer C-4(a) while reducing the inherent viscosity from 1.50 to 1.20 to 1.05.

| Ex No. | Isooctyl Acrylate (%) | Acrylic Acid (%) | Vinyl-Terminated Polymeric Monomer (%) |
|---|---|---|---|
| 28 | 88 | 8 | 4 |
| 29 | 88 | 8 | 4 |
| 30 | 88 | 8 | 4 |

EXAMPLES 31–36

The effect of replacing the polar monomer acrylic acid with acrylamide is observed. The level of acrylamide may be raised to increase shear strength, if desired, while holding the level of the vinyl-terminated polymeric monomer at a minimum.

| Ex. No. | Isooctyl Acrylate (%) | Acrylamide (%) | Vinyl-Terminated Polymeric Monomer (%) |
|---|---|---|---|
| 31 | 89.5 | 3 | 7.5 |
| 32 | 87.5 | 2.5 | 10 |
| 33 | 85.5 | 2 | 12.5 |
| 34 | 83 | 2 | 15 |
| 35 | 93 | 3 | 4 |

-continued

| Ex. No. | Isooctyl Acrylate (%) | Acrylamide (%) | Vinyl-Terminated Polymeric Monomer (%) |
|---|---|---|---|
| 36 | 91 | 2 | 7 |

EXAMPLE 37

A copolymer adhesive composition was prepared from 84.6 parts isooctyl acrylate, 9.4 parts acrylic acid, 6.0 parts vinyl-terminated polymeric monomer C-5.

In a glass reaction bottle 1.2 g vinyl-terminated polymeric monomer C-5 was combined with 16.9 g isooctyl acrylate, 1.9 acrylic acid, 18 g ethyl acetate, 12 g toluene, and 0.06 g free radical initiator ("VAZO" 64). the bottle was purged with nitrogen, sealed and tumbled in a water bath at 55° C. for 24 hours, producing a polymer which was coated on a 37 micrometers polyester film to provide a dry thickness of 25 micrometers.

EXAMPLES 38–40

Adhesive copolymers comprised of isooctyl acrylate, acrylic acid and vinyl-terminated polymeric monomer C-6 were prepared.

| Ex. No. | Isooctyl Acrylate | Acrylic Acid | Vinyl-terminated polymeric monomer |
|---|---|---|---|
| 38 | 90.5 | 6.5 | 3 |
| 39 | 87.5 | 6.5 | 6 |
| 40 | 84.5 | 6.5 | 9 |

EXAMPLES 41–42

A comparison was made to show the effect of varied amounts of vinyl-terminated polymeric monomer C-7 having a weight average molecular weight of 22,000.

Example 41 consisted of 89.3 parts isooctyl acrylate, 4.7 parts acrylic acid and 6 parts vinyl-terminated polymeric monomer C-7 and had an inherent viscosity of 0.62. It will be noted that this material had a shear strength value of 20 minutes and a peel adhesion of 70 Newtons per 100 mm.

By contrast, Example 42, comprising 83.6 parts isooctyl acrylate, 4.4 parts acrylic acid and 12 parts vinyl-terminated polymeric monomer C-7, had an inherent viscosity of 0.47. When tested, the adhesive composition of Example 42 had a shear strength value of 1,292 minutes and a peel adhesion value of 46 Newtons per 100 mm.

This dramatic difference in cohesive strength as meauured by shear strength clearly demonstrates the effectiveness of the inclusion of the pendant polymeric moiety of the vinyl-terminated polymeric monomer and how its length and the frequency of the pendant group along the copolymer backbone of the adhesive affect the properties of the coated sheet material.

EXAMPLES 43–45

Adhesive compositions were prepared from isooctyl acrylate and vinyl-terminated polymeric monomer having a molecular weight of 30,000 (Monomer C-8) and varying amounts of acrylic acid from zero to 6%. The proportions and results are shown in Table III.

EXAMPLES 46–48

Adhesive compositions were formed by copolymerizing isooctyl acrylate, acrylic acid and vinyl-terminated polymeric monomer C-9 to demonstrate the usefulness of vinyl-terminated polymeric monomer having a high polydisprsity. Examples 46, 47 and 48 utilized vinyl-terminated polymeric monomers C-9, 10 and 11, respectively.

EXAMPLE 49

Following the procedure of the previous examples, a copolymer of isooctyl acrylate, acrylic acid and vinyl-terminated polymeric monomer prepared by free radical method, monomer C-12, was prepared by charging a bottle with 1.2 g of monomer C-12, 16.5 g isooctyl acrylate, 1.3 g acrylic acid, 30 g ethyl acetate, 1 g of 0.5% carbon tetrabromide chain transfer agent in isooctyl acrylate and 0.06 g free radical initiator ("VAZO" 64).

This Example shows that very acceptable adhesive can be made from vinyl-terminated polymeric monomer prepared by free radical polymerization. See Table III for performance.

EXAMPLE 50

A psa composition was formed by copolymerizing isooctyl acrylate, acrylic acid and vinyl-terminated polymeric monomer C-13 having a polyvinyl toluene polymeric moiety. Comparison of the shear strength and peel adhesion of the coated sheet material of this example with the example containing a vinyl-terminated polymeric monomer having a polystyrene polymeric moiety, e.g., Example 4, reveals effectiveness of polyvinyltoluene as a "Z" segment.

EXAMPLES 51–53

The following three adhesive compositions were prepared employing the C-3 vinyl-terminated polymeric monomer. The composition of the backbone was varied as shown below.

| Ex. No. | Isoocytl acrylate | 2-Ethyl hexyl acrylate | Acrylic acid | Methyl-methacrylate | Lauryl methacrylate | Vinyl terminated polymeric monomer |
|---|---|---|---|---|---|---|
| 51 | 82 | none | 5 | 7 | none | 6 |
| 52 | 64 | " | 5 | none | 25 | 6 |
| 53 | none | 89 | 5 | " | none | 6 |

EXAMPLES 54–60

Adhesive compositions comprising copolymers of isooctyl acrylate and vinyl-terminated polymeric monomer C-2 were prepared using various polar monomers.

| Ingredients | 54 | 55 | 56 | 57 | 58 | 59 | 60 |
|---|---|---|---|---|---|---|---|
| vinyl-terminated polymeric monomer | 6 | 6 | 6 | 2 | 6 | 6 | 6 |
| isooctyl acrylate | 90 | 90 | 90 | 92.2 | 90 | 90 | 90 |
| acrylic acid | 4 | | | | | | |
| methacrylic acid | | 4 | | | | | |
| itaconic acid | | | 4 | | | | |
| acrylamide | | | | 5.8 | | | |
| methacrylamide | | | | | 4 | | |
| acrylonitrile | | | | | | 4 | |
| methacrylonitrile | | | | | | | 4 |

EXAMPLES 61–66

Adhesive compositions were prepared by copolymerizing isooctyl acrylate, acrylic acid and vinyl-terminated polymeric monomer C-2 in a weight ratio of 88:6:6, but controlling the copolymerization to have a range of inherent viscosities as shown in Table III.

EXAMPLES 67–69

An adhesive composition was prepared by copolymerizing isooctyl acrylate and vinyl-terminated polymeric monomer C-14. The adhesive composition was prepared by dissolving 3.5 parts of the monomer in 32.5 parts of ethyl acetate with 14 parts of isooctyl acrylate and 0.02 parts azobis(isobutyronitrile) ("VAZO"64). This mixture was sealed in a bottle purged with nitrogen and mixed at 55° C. in a water bath for 24 hours. The resultant polymer had an inherent viscosity of 0.74 and was coated on a 37 micrometers polyester film and dried to give a 37 micrometers adhesive coating thickness.

In Example 68, polymethyl methacrylate which has no vinyl-termination was used in place of the C-14 monomer of Example 67. This so-called "dead" macromer (C-15) was copolymerized with isooctylacrylate and acrylic acid. As expected, the polymethyl methacrylate did not incorporate into the acrylic ester backbone. The resulting mixture separated on standing into two layers.

Example 69 was prepared with isooctyl acrylate alone producing a polymerized product having an inherent viscosity of 0.79. This material was coated on 37 micrometers polyester to provide a dried coating thickness of 37 micrometers. Upon testing, the shear strength was only 0.1 minute and the peel strength could not be determined because of cohesive failure of the adhesive.

EXAMPLES 70–72

These adhesives were prepared as described in Examples 67–69 using the same 10,000 M.W. vinyl terminated methyl methacrylate polymeric monomer ("C-14").

Example 70 had 80 parts of isooctyl acrylate ("A" Monomer); 10 parts of acrylic acid ("B" Monomer) and 10 parts of the "C-14" Monomer.

Example 71 was a control example wherein the "C" Monomer has been omitted.

Example 72 was a control example wherein methyl methacrylate was substituted in place of the "C" Monomer.

EXAMPLE 73

This adhesive was prepared according to the procedure outlined in preceding Examples 67–69 but with a different "C" Monomer. The vinyl-terminated methyl methacrylate polymeric monomer of this example, "C-15", has a molecular weight of about 14,000 and a polydispersity of 1.20.

EXAMPLE 74

An adhesive was prepared from 92 IOA/4AA/4 "C-17" where "C-17" is 10,000 MW copolymer of "85 styrene/15 t-butyl styrene" with methacrylate termination.

To a 1 pint amber screw-cap bottle was added isooctyl acrylate (73.6 g), acrylic acid (3.20 g), polystyrene-co-t-butyl styrene macromer (3.20 g), ethyl acetate (160 g), and azobisisobutyronitrile (0.24 g). The mixture was degassed for five minutes with argon and placed in a launderometer at 60° C. for 30 hours. The polymer solution was diluted to 25% solids and coated onto 50 micrometer primed polyethylene terephthalate film to provide a dry coating weight of 500 mg per 200 $cm^2$.

TABLE I

| | "A"Monomer |
|---|---|
| Abbreviation | Compound |
| EHA | Ethyl hexyl acrylate |
| LMA | Lauryl methacrylate |
| IOA | Isooctyl acrylate |
| MMA | Methyl methacrylate |

| | "B"Monomer |
|---|---|
| Abbreviation | Compound |
| AA | Acrylic acid |
| MAA | Methacrylic acid |
| ITA | Itaconic acid |
| ACM | Acrylamide |
| MACM | Methacrylamide |
| ACN | Acrylonitrile |
| MACN | Methacrylonitrile |

TABLE II

"C" Monomer (Vinyl-Terminated Polymeric Monomer)

| Designation | Repeating Unit | Termination | Molecular Weight | Polydispersity |
|---|---|---|---|---|
| C-1 | Styrene | Methacrylate | 4,000 | 1.16 |
| C-2 | Styrene | Methacrylate | 9,000 | 1.05 |
| C-3 | Styrene | Acrylate | 12,000 | 1.34 |
| C-4 (a) | Styrene | Methacrylate | 20,000 | 1.08 |
| C-4 (b) | Styrene | Methacrylate | 10,000 | 1.09 |
| C-5 | t-butyl Styrene | Acrylate | 12,000 | 1.13 |
| C-6 | Alphamethyl Styrene | Acrylate | 10,000 | 1.68 |
| C-7 | Styrene | Acrylate | 22,000 | 1.22 |
| C-8 | Styrene | Methacrylate | 30,000 | 1.20 |
| C-9 | Styrene | Methacrylate | 18,000 | 1.94 |
| C-10 | Styrene | Methacrylate | 20,000 | 1.92 |
| C-11 | Styrene | Methacrylate | 22,000 | 2.26 |
| C-12 | Styrene | Metharylate | 18,000 | 1.99 |
| C-13 | Vinyl Toluene | Methacrylate | 10,000 | 1.11 |
| C-14 | Methyl Methacrylate | Acrylate | 10,000 | 2.60 |
| C-15 | Methyl Methacrylate | Vinyl | 14,000 | 1.20 |
| C-16 | Methyl Methacrylate | Non-functional | 7,000 | 4.10 |
| C-17 | Styrene-co-t-butyl styrene | Methacrylate | 10,000 | 1.09 |

TABLE III

ADHESIVE EXAMPLES

| Ex. No. | "A" | PBW | "B" | PBW | "C" | PBW | Inherent Viscosity | Shear (Minutes) | Peel N/100 mm |
|---|---|---|---|---|---|---|---|---|---|
| 1 | IOA | 95 | AA | 5 | none | none | 0.71 | 1 | 79 |
| 2 | IOA | 90 | AA | 10 | none | none | 0.78 | 43 | 77 |
| 3 | IOA | 90.5 | AA | 6.5 | C-1 | 3 | — | 26 | 66 |
| 4 | IOA | 87.5 | AA | 6.5 | C-1 | 6 | 0.87 | 549 | 50 s |
| 5 | IOA | 84.5 | AA | 6.5 | C-1 | 9 | 0.84 | 3,234 | 50 |

TABLE III-continued

ADHESIVE EXAMPLES

| Ex. No. | "A" | PBW | "B" | PBW | "C" | PBW | Inherent Viscosity | Shear (Minutes) | Peel N/100 mm |
|---|---|---|---|---|---|---|---|---|---|
| 6 | IOA | 81.5 | AA | 6.5 | C-1 | 12 | 0.81 | 4,474 | 18–48 s |
| 7 | IOA | 78.5 | AA | 6.5 | C-1 | 15 | — | 8.186 | 0–66 vs |
| 8 | IOA | 73.5 | AA | 6.5 | C-1 | 20 | — | 10,000+ | 4–61 vs |
| 9 | IOA | 88.0 | AA | 3.0 | C-1 | 9 | 0.80 | 158 | 70 |
| 10 | IOA | 82.0 | AA | 3.0 | C-1 | 15 | — | 544 PO | 50 |
| 11 | IOA | 87.5 | AA | 6.5 | C-2 | 6 | 0.79 | 3,073 | 59 |
| 12 | IOA | 89.3 | AA | 4.7 | C-3 | 6 | 0.58 | 1,008 | 67 |
| 13 | IOA | 90 | none | none | C-4b | 10 | 1.26 | 20 | 66 |
| 14 | IOA | 85 | none | none | C-4b | 15 | 1.27 | 68 | 48 |
| 15 | IOA | 80 | none | none | C-4b | 20 | 1.52 | 10,000+ | 37 |
| 16 | IOA | 76 | AA | 4 | C-4b | 20 | 1.63 | 10,000+ | 81 |
| 17 | IOA | 81 | AA | 4 | C-4a | 15 | 1.44 | 10,000+ | 81 |
| 18 | IOA | 94 | AA | 2 | C-4a | 4 | 1.27 | 106 | 72 |
| 19 | IOA | 91 | AA | 2 | C-4a | 7 | — | 642 | 70 |
| 20 | IOA | 91 | AA | 5 | C-4a | 4 | — | 8,870 | 92 |
| 21 | IOA | 88 | AA | 2 | C-4a | 10 | 1.25 | 218 | 59 |
| 22 | IOA | 88 | AA | 5 | C-4a | 7 | — | 6.460 | 83 |
| 23 | IOA | 88 | AA | 8 | C-4a | 4 | 1.50 | 20,000+ | 90 |
| 24 | IOA | 90 | AA | 4 | C-4a | 6 | — | 3.530 | 74 |
| 25 | IOA | 89 | AA | 3 | C-4a | 8 | — | 224 | 74 |
| 26 | IOA | 89 | AA | 3 | C-4a | 8 | — | 674 | 74 |
| 27 | IOA | 89 | AA | 3 | C-4a | 8 | — | 716 | 74 |
| 28 | IOA | 88 | AA | 8 | C-4a | 4 | 1.50 | 20,000+ | 90 |
| 29 | IOA | 88 | AA | 8 | C-4a | 4 | 1.20 | 10,000+ | 74 |
| 30 | IOA | 88 | AA | 8 | C-4a | 4 | 1.05 | 10,000+ | 83 |
| 31 | IOA | 89.5 | ACM | 3 | C-4a | 7.5 | — | 602 | 70 |
| 32 | IOA | 87.5 | ACM | 2.5 | C-4a | 10 | — | 305 | 50 |
| 33 | IOA | 85.5 | ACM | 2 | C-4a | 12.5 | — | 184 | 50 |
| 34 | IOA | 83 | ACM | 2 | C-4a | 15 | — | 195 | 42 |
| 35 | IOA | 93 | ACM | 3 | C-4a | 4 | — | 331 | 79 |
| 36 | IOA | 91 | ACM | 2 | C-4a | 7 | — | 132 | 68 |
| 37 | IOA | 84.6 | AA | 9.4 | C-5 | 6 | 0.59 | 215 | 70 |
| 38 | IOA | 90.5 | AA | 6.5 | C-6 | 3 | 0.87 | 190 | 53 |
| 39 | IOA | 87.5 | AA | 6.5 | C-6 | 6 | 0.83 | 10,000+ | 57 |
| 40 | IOA | 84.5 | AA | 6.5 | C-6 | 9 | 0.75 | 10,000+ | 57 |
| 41 | IOA | 89.3 | AA | 4.7 | C-7 | 6 | 0.62 | 20 | 70 |
| 42 | IOA | 83.6 | AA | 4.4 | C-7 | 12 | 0.47 | 1,292 | 46 |
| 43 | IOA | 88 | none | none | C-8 | 12 | 0.67 | 13 PO | 61 |
| 44 | IOA | 85 | AA | 3 | C-8 | 12 | 0.69 | 145 PO | 55 |
| 45 | IOA | 82 | AA | 6 | C-8 | 12 | 0.74 | 10,000+ | 59 |
| 46 | IOA | 87.5 | AA | 6.5 | C-9 | 6 | 0.85 | 1,300 | 70 |
| 47 | IOA | 87.5 | AA | 6.5 | C-10 | 6 | 0.80 | 10,000+ | 59 |
| 48 | IOA | 87.5 | AA | 6.5 | C-11 | 6 | 0.81 | 4,159 | 61 |
| 49 | IOA | 87.5 | AA | 6.5 | C-12 | 6 | 1.16 | 10,000+ | 55 |
| 50 | IOA | 87.5 | AA | 6.5 | C-13 | 6 | 0.81 | 8,990 | 59 |
| 51 | MMA IOA | 7 82 | AA | 5 | C-3 | 6 | 0.96 | 10,000+ | 59 |
| 52 | LMA IOA | 25 64 | AA | 5 | C-3 | 6 | 0.72 | 2,735 | 66 |
| 53 | 2-EHA | 89 | AA | 5 | C-3 | 6 | 0.91 | 4,250 | 61 |
| 54 | IOA | 90 | AA | 4 | C-2 | 6 | 0.99 | 462 PO | 66 |
| 55 | IOA | 90 | MAA | 4 | C-2 | 6 | 0.65 | 25 PO | 53 |
| 56 | IOA | 90 | ITA | 4 | C-2 | 6 | 0.54 | 10,000+ | 66 |
| 57 | IOA | 92.2 | ACM | 5.8 | C-2 | 2 | 0.82 | 2,950 | 53 |
| 58 | IOA | 90 | MACM | 4 | C-2 | 6 | 0.65 | 672 PO | 61 |
| 59 | IOA | 90 | ACN | 4 | C-2 | 6 | 0.57 | 32 PO | 46 |
| 60 | IOA | 90 | MACN | 4 | C-2 | 6 | 0.33 | 2 | 48 |
| 61 | IOA | 88 | AA | 6 | C-2 | 6 | 0.67 | 755 | 70 |
| 62 | IOA | 88 | AA | 6 | C-2 | 6 | 0.52 | 585 | 50 |
| 63 | IOA | 88 | AA | 6 | C-2 | 6 | 0.37 | 396 | 63 |
| 64 | IOA | 88 | AA | 6 | C-2 | 6 | 0.35 | 203 | 61 |
| 65 | IOA | 88 | AA | 6 | C-2 | 6 | 0.32 | 131 | 55 |
| 66 | IOA | 88 | AA | 6 | C-2 | 6 | 0.25 | 9 | 50 |
| 67 | IOA | 80 | none | none | C-14 | 20 | 0.74 | 12 | 53 |
| 68 | IOA | 80 | none | none | C-16 | 20 | 0.37 | 0.1 | 0 |
| 69 | IOA | 100 | none | none | none | none | 0.79 | 0.1 | 0 |
| 70 | IOA | 80 | AA | 10 | C-14 | 10 | 0.77 | 728 | 61 |
| 71 | IOA | 90 | AA | 10 | none | none | 0.81 | 83 | 83 |
| 72 | MMA IOA | 10 80 | AA | 10 | none | none | 0.84 | 298 | 74 vs |
| 73 | IOA | 80 | AA | 10 | C-15 | 10 | 0.82 | 440 | 74 |
| 74 | IOA | 92 | AA | 4 | C-17 | 4 | 0.81 | 170 | 78 |

Abbreviated notations re adhesive properties:
S = shocky;
VS = very shocky;
PO = pop-off

EXAMPLE 75

Three blends of Monomer "C-3"(12,000 MW) and Monomer "C-7"(22,000 MW) were copolymerized with isoocytyl acrylate and acrylic acid to compare the shear and peel adhesion properities to adhesives which had "C-3" and "C-7" Monomers used without blending. Both Monomers are acrylate-terminated polystyrene. The preparation of these adhesives followed the procedure described in Examples 3–10.

|         | MONOMER |     | "C"MONOMERS |       |      |      | SHEAR     | PEEL     |
|---------|---------|-----|-------------|-------|------|------|-----------|----------|
|         | "A"     | "B" | "C-3"       | "C-7" | P    | I.V. | (Minutes) | N/100 mm |
| Control | 88      | 6   | 6           | 0     | 1.06 | 0.79 | 2,245     | 57       |
| "       | 82      | 6   | 0           | 12    | 1.02 | 0.74 | 1,093     | 50       |
| Blend   | 84      | 6   | 2           | 8     | 1.16 | 0.83 | 1,675     | 50       |
| "       | 85      | 6   | 3           | 6     | 1.28 | 0.78 | 1,603     | 50       |
| "       | 85      | 6   | 6           | 3     | 1.31 | 0.85 | 1,395     | 53       |

This example clearly demonstrates that very acceptable psas can be made from completely random arrangement of long and short pendant grafts on the compliant acrylic backbone.

EXAMPLE 76

A methacrylate-terminated polystyrene polymeric monomer having an average molecular weight of about 9,000 was synthesized using the techniques described for C-1. Styrene monomer (162 g) was added to 1900 ml (1463 g) of cyclohexane, resulting in a 10% by weight solution. A 1.1 molar solution of sec-butyllithium (14.7 ml) was added to the monomer solution and the reaction permitted to proceed as described for Monomer "C-1". The polystyryl anion was capped with 5.0 ml freshly distilled propylene oxide. The dark-orange color faded to yellow but did not disappear after 30 minutes rapid agitation The macromonomer was terminated with 5.0 ml (5.7 g) freshly distilled methacryloyl chloride and precipitated as described previously. $\overline{M}_n$ 6669; $\overline{M}_w$ 8525; p=1.28.

An adhesive terpolymer was prepared using 6.0 parts vinyl-terminated polymeric monomer, 6.5 parts acrylic acid and 87.5 parts isooctyl acrylate. The inherent viscosity of the adhesive was 0.78. Tape properties were measured as described previously. Shear 3183 min.; adhesion 62 N/100 mm.

This example shows that a satisfactory macromer can be produced by capping with propylene oxide instead of the preferred ethylene oxide cap.

EXAMPLE 77

A vinyl-terminated polystyrene polymeric monomer having a weight average molecular weight 7000 was prepared by the method of "C-1", except that maleic anhydride was used as a terminating agent. $\overline{M}_n$ 5731; $\overline{M}_w$ 6898; p=1.203.

An adhesive terpolymer was prepared using 15 parts polymeric monomer, 6.5 parts acrylic acid and 78.5 parts isooctyl acrylate. Shear was measured as 53 min., adhesion 35 N/100 mm.

Shear strength improvement was not impressive because there was very little incorporation of this maleic anhydride-terminated macromer into the copolymer backbone.

EXAMPLE 78

A vinyl-terminated polystyrene polymeric monomer having a weight average molecular weight of 7000 was prepared by the method of "C-1", except that allyl bromide was used as the terminating agent. $\overline{M}_n$ 6394; $\overline{M}_w$ 6798; p=1.063.

An adhesive terpolymer was prepared using 15 parts polymeric monomer, 6.5 parts acrylic acid and 78.5 parts isooctyl acrylate. Shear was measured as 30 min., adhesion 42 N/100 mm. I.V.=0.65.

Shear strength improvement was very limited because there is very little incorporation of this allyl-terminated macromer into the adhesive copolymer.

EXAMPLE 79

A vinyl-terminated polystyrene polymeric monomer having a weight average molecular weight of 7000 was prepared by the method of "C-1", except that the terminating agent was vinyl benzyl chloride $\overline{M}_n$ 5962, $\overline{M}_w$ 6521, p=1.093.

An adhesive terpolymer was prepared using 15 parts polymeric monomer, 6.5 acrylic acid and 78.5 parts isooctyl acrylate. Shear was measured as 115 min. Peel adhesion was 35 N/100 mm.

Shear strength improvement was very modest because the incorporation of the macromer was minimal.

EXAMPLE 80

This example shows that a very acceptable psa product with exceptional shear strength can be produced by grafting methyl methacrylate monomer to a preformed polymer backbone.

In the first step of a two step process, the polymer backbone was prepared by reacting 156.8 grams of isooctyl acrylate, 3.2 grams of dimethylaminoethyl methacrylate, 240 grams of ethyl acetate and 0.48 gram "VAZO" catalyst in a one liter amber bottle. The bottle was purged with nitrogen, sealed and placed in a rotating holder in a water bath at 54° C. for 22 hours. The temperature of the bath was raised to 60° C. for 4 additional hours of reaction time. The resulting polymeric solution had a solids content of 38.4% and an inherent viscosity of 0.71.

In the second step, 350 grams of the polymeric solution from step one were combined with 60 grams of methyl methacrylate, 100 grams of toluene and 0.5 gram of 9-fluorenone in a one liter glass flask fitted with thermometer, condenser, stirrer and an inlet for nitrogen which was used to purge the flask to eliminate the oxygen atmosphere over the reaction mixture. The contents of the flask were subjected to the ultraviolet radiation of two 15 watt (GE F-15T8BL) black light tubes for 16 hours. The viscosity of the solution increased and the distinctive yellow color of the 9-fluorenone disappeared indicating that reaction had taken place. The grafted product was in a clear solution having a solids content of 32.4%. The inherent viscosity of the resulting polymer was 0.85. This adhesive solution was coated onto 37 micrometer polyester film to a dried thickness of 25 micrometers to produce a pressure-sensitive adhesive coated film having a peel adhesion of 60 Newtons/100mm and shear strength of over 10,000 minutes.

EXAMPLE 81

This example shows that a product with good shear strength and good adhesion may be achieved by grafting polymer to a polymer backbone.

A preformed copolymer backbone of 94 parts of isooctyl acrylate and 6 parts of acrylic acid was polymerized in ethyl acetate by standard free radical methods to an inherent viscosity of 0.61.

The preformed grafting polymer, prepared by anionic polymerization, was hydroxy-terminated polystyrene having a molecular weight of about 14,000 and a polydispersity of 1.07.

The polymeric backbone (231 grams of a 14.9% toluene solution) was combined with 2.1 grams of the preformed grafting polymer and 0.2 gram of p-toluene sulfonic acid catalyst. This mixture was heated to reflux with stirring in 500 ml round bottom flask for 24 hours and water of esterification was removed with a Dean Stark trap. The resulting polymer adhesive was coated onto 37 micrometer polyester film to a dried thickness of 25 micrometers. This produced a psa coated film product with a peel adhesion of 116 Newtons/100 mm and a shear strength of 624 minutes.

While this invention has been described in connection with specific embodiments, it should be understood that it is capable of further modification. For example, moderate amounts of other copolymerizable monomers such as vinyl acetate, hydroxyethyl acrylate, hydroxyethyl methacrylate or N-vinyl-2-pyrrolidone and the like may also be used. The claims herein are intended to cover those variations which one skilled in the art would recognize as the chemical equivalent of what has been described here.

We claim:

1. A normally tacky and pressure-sensitive adhesive composition comprising copolymer having an inherent viscosity greater than 0.2 and consisting essentially of copolymerized repeating A and C monomers and optionally B monomers, wherein A is a monomeric acrylic or methacrylic acid ester of a non-tertiary alcohol, said alcohol having from 1 to 14 carbon atoms with the average number of carbon atoms being about 4–12;

when used, B is at least one polar monomer copolymerizable with said monomeric acrylic acid ester, the amount by weight of B monomer being up to 12% of the total weight of all monomers; and C is a monomer having the general formula X—(Y)$_n$—Z wherein X is a vinyl group copolymerizable with said A and B monomers;

Y is a divalent linking group; where n can be zero or 1;

Z is a monovalent polymeric moiety having a $T_g$ greater than 20° C. and a molecular weight in the range of about 2,000 to 30,000 and being essentially unreactive under copolymerization conditions;

wherein said vinyl group and said A and B monomers are copolymerized to form a soft polymeric backbone having pendant therefrom said polymeric moieties and wherein the weight of said C monomer is within the range of about 1 to 30% of the total weight of all monomers in said copolymer and the total weight of said B and C monomers in said copolymer is within the range of about 4 to 30% of the total weight of all monomers in said copolymer, the amount of said C monomer in said polymer is such as to provide said adhesive composition with a shear holding value of at least 50 minutes.

2. The adhesive composition of claim 1 wherein the polar monomer is selected from acrylic acid, methacrylic acid, itaconic acid, acrylamide, methacrylamide, acrylonitrile and methacrylonitrile.

3. The pressure sensitive adhesive composition of claim 1 wherein the X group of said C monomer has the general formula $$\begin{array}{cc} R & R' \\ | & | \\ CH= & C- \end{array}$$

wherein R is a hydrogen atom or a COOH group and R' is a hydrogen atom or a methyl group.

4. The pressure-sensitive adhesive composition of claim 1 wherein the Z group of said C monomer has the general formula $$\begin{array}{c} R^2 \\ | \\ (C-CH_2)_n R^3 \\ | \\ R^4 \end{array}$$

wherein $R^2$ is a hydrogen atom or a lower alkyl group, $R^3$ is a lower alkyl group, n is an interger from 20 to 500 and $R^4$ is a monovalent radical selected from the group consisting of

[phenyl ring with $R^5$ substituent]

and —$CO_2R^6$ wherein $R^5$ is a hydrogen atom or a lower alkyl group and $R^6$ is a lower alkyl group.

5. The pressure-sensitive adhesive composition of claim 1 wherein said C monomer has a general formula selected from the group consisting of $$\begin{array}{c} O \quad\quad H \\ \| \quad\quad | \\ X-C-O-C-CH_2-Z \\ \quad\quad | \\ \quad\quad R^7 \end{array}$$

$$\begin{array}{c} O \quad\quad\quad\quad\quad\quad O \quad\quad H \\ \| \quad\quad\quad\quad\quad\quad \| \quad\quad | \\ X-C-O-CH_2CH_2-N-C-O-C-CH_2-Z \\ \quad\quad\quad\quad\quad\quad\quad\quad\quad\quad | \\ \quad\quad\quad\quad\quad\quad\quad\quad\quad\quad R^7 \end{array}$$

$$\begin{array}{c} R^7 \\ | \\ X-CH_2-O-C-CH_2-Z \\ | \\ H \end{array}$$

$$\begin{array}{c} \quad\quad\quad\quad\quad\quad\quad H \\ \quad\quad\quad\quad\quad\quad\quad | \\ X-[phenyl]-CH_2-O-C-CH_2-Z \\ \quad\quad\quad\quad\quad\quad\quad | \\ \quad\quad\quad\quad\quad\quad\quad R^7 \end{array}$$

$$\begin{array}{c} O \quad\quad\quad\quad\quad\quad H \\ \| \quad\quad\quad\quad\quad\quad | \\ X-O-C-CH_2-O-C-CH_2-Z \\ \quad\quad\quad\quad\quad\quad | \\ \quad\quad\quad\quad\quad\quad R^7 \end{array}$$

-continued

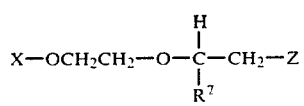

wherein R⁷ is a hydrogen atom or a lower alkyl group.

6. The pressure-sensitive adhesive composition of claim 1 wherein said A monomer is isooctyl acrylate, said B monomer is acrylic acid and said C monomer is methacrylate-terminated polystyrene.

7. The adhesive composition of claim 1 wherein said B monomer is selected from the group consisting of acrylic acid, methacrylic acid, itaconic acid, acrylamide, methacrylamide, acrylonitrile and methacrylonitrile.

8. The pressure-sensitive adhesive composition of claim 1 wherein said copolymer contains from 2 to 8% by weight of B monomer of the total weight of all monomers.

* * * * *

UNITED STATES PATENT AND TRADEMARK OFFICE
CERTIFICATE OF CORRECTION

PATENT NO. : 4,554,324                      Page 1 of 2

DATED : November 19, 1985

INVENTOR(S) : Husman, Kellen, Mc Cluney and Tumey

It is certified that error appears in the above-identified patent and that said Letters Patent is hereby corrected as shown below:

In the Specification:

Col. 4, line 23, "X-(Y)$n_n$-Z" should read --X-(Y)$_n$-Z--.

Col. 10, line 49, "coapositions" should read --compositions--.

Col. 12, first 12 lines should read

--Inherent Viscosity Measurements

In order to understand the benefits derived from the teachings of this invention, it is necessary to relate the improvements in shear strength and processability to the molecular weight of the adhesive and of the polymeric monomer which is incorporated into the adhesive. For this purpose, the measurement of the viscosity of dilute solutions of the adhesive clearly demonstrates the degree of improvement when compared to controls run under the same conditions. It is the comparative values which are significant and absolute figures are not required.--

Col. 15, line 42, after 1.68. and before "An", --MONOMER "C-7"-- should be centered.

UNITED STATES PATENT AND TRADEMARK OFFICE
CERTIFICATE OF CORRECTION

PATENT NO. : 4,554,324

DATED : November 19, 1985

INVENTOR(S) : Husman, Kellen, Mc Cluney and Tumey

It is certified that error appears in the above-identified patent and that said Letters Patent is hereby corrected as shown below:

Col. 17, line 36, "monomar" should read --monomer--.

Col. 21, line 50, "meauured" should read --measured--.

Col. 24, lines 3-6 should read

--EXAMPLE 74

An adhesive was prepared from 92 IOA/4AA/4 "C-17" where "C-17" is 10,000 MW copolymer of "85 styrene/15 t-butyl styrene" with methacrylate termination.--

Col. 27, line 6, "properities" should read --properties--.

Col. 30, line 51, should read

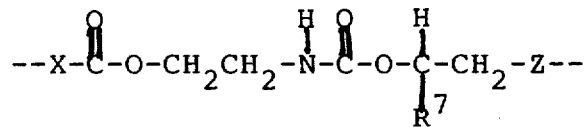

Signed and Sealed this

Twenty-second Day of April 1986

[SEAL]

Attest:

DONALD J. QUIGG

Attesting Officer     Commissioner of Patents and Trademarks